United States Patent
Ishiyama et al.

(10) Patent No.: US 9,148,533 B2
(45) Date of Patent: Sep. 29, 2015

(54) PROCESSING INSTRUCTION DEVICE, PROCESSING APPARATUS, AND NON-TRANSITORY COMPUTER READABLE MEDIUM

(71) Applicant: FUJI XEROX CO., LTD., Minato-ku, Tokyo (JP)

(72) Inventors: Tokihiro Ishiyama, Kanagawa (JP); Takafumi Kumazaki, Kanagawa (JP); Masakazu Ketsuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 96 days.

(21) Appl. No.: 14/134,204

(22) Filed: Dec. 19, 2013

(65) Prior Publication Data

US 2014/0355045 A1  Dec. 4, 2014

(30) Foreign Application Priority Data

May 31, 2013  (JP) .................................. 2013-115829

(51) Int. Cl.
| | |
|---|---|
| G06F 15/00 | (2006.01) |
| G06K 1/00 | (2006.01) |
| G06F 3/12 | (2006.01) |
| H04N 1/00 | (2006.01) |

(52) U.S. Cl.
CPC ......... *H04N 1/00411* (2013.01); *H04N 1/0048* (2013.01); *H04N 1/00474* (2013.01); *H04N 1/00482* (2013.01); *H04N 1/00514* (2013.01)

(58) Field of Classification Search
None
See application file for complete search history.

(56) References Cited

U.S. PATENT DOCUMENTS

| | | | |
|---|---|---|---|
| 6,975,417 B1* | 12/2005 | Hilpl et al. | 358/1.15 |
| 2002/0144257 A1* | 10/2002 | Matsushima | 717/178 |
| 2006/0232811 A1* | 10/2006 | Yokoyama | 358/1.14 |
| 2007/0046996 A1* | 3/2007 | Matsuda | 358/1.18 |
| 2007/0136293 A1* | 6/2007 | Mizumukai | 707/9 |
| 2007/0253010 A1* | 11/2007 | Selvaraj | 358/1.13 |
| 2009/0207439 A1* | 8/2009 | Oomura | 358/1.15 |
| 2011/0075176 A1* | 3/2011 | Nishio | 358/1.13 |
| 2012/0086975 A1* | 4/2012 | Ozaki | 358/1.15 |
| 2012/0120435 A1* | 5/2012 | Osada | 358/1.13 |
| 2013/0169831 A1* | 7/2013 | Tomi | 348/207.2 |
| 2014/0355044 A1* | 12/2014 | Ketsuka et al. | 358/1.15 |
| 2014/0355046 A1* | 12/2014 | Kumazaki et al. | 358/1.15 |

FOREIGN PATENT DOCUMENTS

| | | |
|---|---|---|
| JP | 2011-180888 A | 9/2011 |
| JP | 2011-257957 A | 12/2011 |

* cited by examiner

*Primary Examiner* — Ming Hon
(74) *Attorney, Agent, or Firm* — Sughrue Mion, PLLC

(57) ABSTRACT

A processing instruction device includes a memory, a display instruction data acquisition unit, a display controller, an operation data acquisition unit, and a processing instruction unit. The memory stores management data and condition data. The display instruction data acquisition unit acquires display instruction data. The display instruction data is data for giving an instruction to display an image including an operator corresponding to each of the one or more pieces of processing instruction data selected from among one or more pieces of processing instruction data stored in the memory. The operation data acquisition unit acquires operation data indicating an operation of a user from an operation device that receives a user operation. The processing instruction unit instructs at least one of the image forming device, the imaging device, and the data communication device to perform a processing operation in accordance with processing instruction data corresponding to the one operator.

12 Claims, 9 Drawing Sheets

| USER ID | AUTHENTICATION CODE | PRIVILEGE DATA |
|---|---|---|
| . . . | . . . | . . . |
| . . . | . . . | . . . |
| . . . | . . . | . . . |

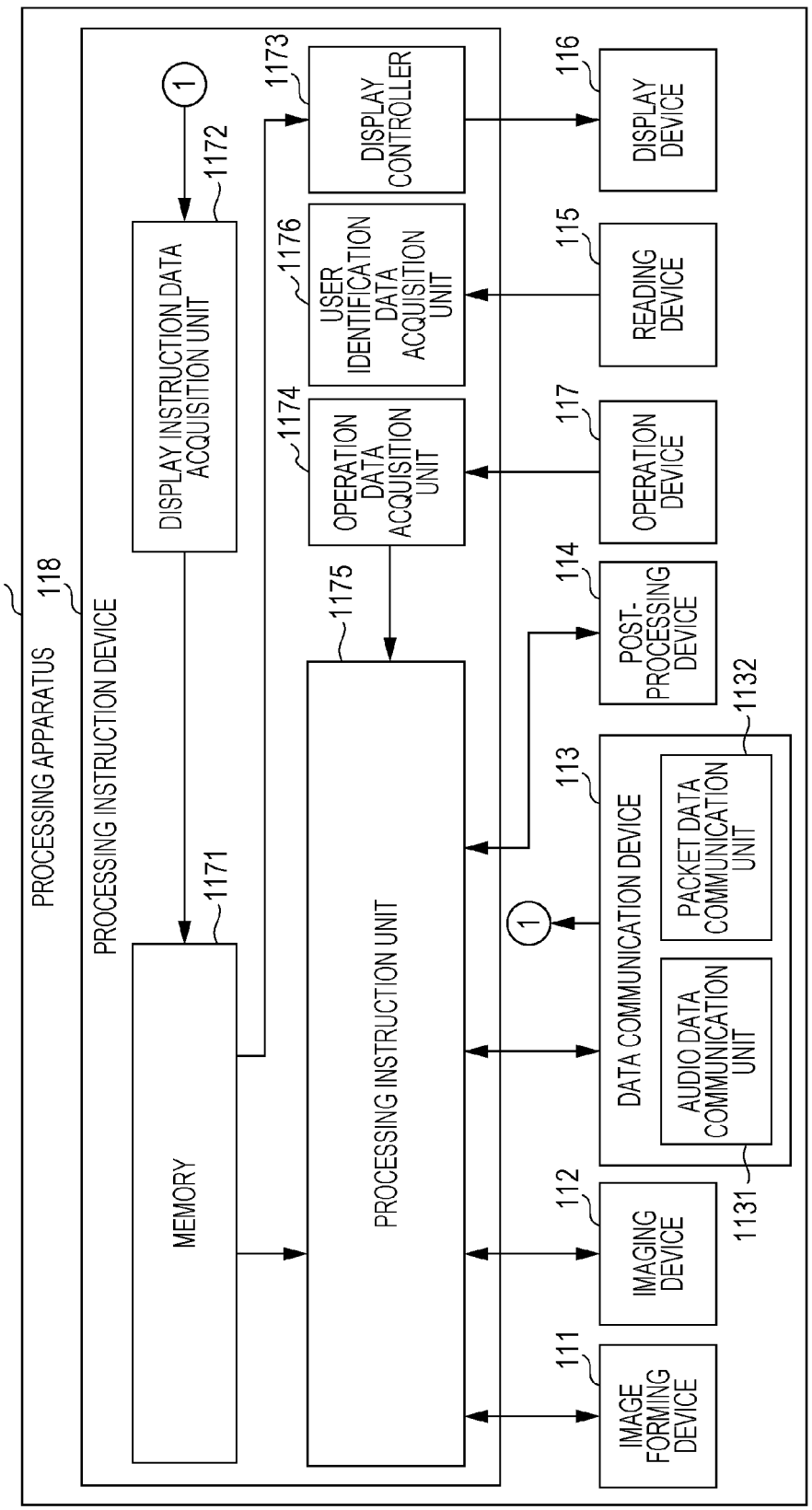

FIG. 5

| PROCESSING ID | PROCESSING NAME | PROCESSING ATTRIBUTE | PROCESSING DATA INSTRUCTION |
|---|---|---|---|
| N001 | BASIC COPYING | ... | ... |
| N002 | BASIC SCANNING | ... | ... |
| N003 | BASIC FAX | ... | ... |
| P105 | ONE-TOUCH COPYING | PAPER TO BE USED : NORMAL PAPER<br>COLOR/MONOCHROME : MONOCHROME<br>POST-PROCESSING : NO<br>EXTERNAL NETWORK CONNECTION : NO | ... |
| P238 | ANYWHERE PRINTING FOR PRESENTATIONS | PAPER TO BE USED : BOND PAPER<br>COLOR/MONOCHROME : COLOR<br>POST-PROCESSING : YES<br>EXTERNAL NETWORK CONNECTION : YES | ... |
| ... | ... | ... | ... |

FIG. 6  USER ID: 1234

| DISPLAY POSITION | PROCESSING ID |
|---|---|
| 1 | N001 |
| 2 | N002 |
| 3 | N003 |
| ⋮ | ⋮ |

FIG. 7  USER ID: 1234

| DISPLAY POSITION | PROCESSING ID |
|---|---|
| 1 | N001 |
| 2 | P238 |
| 3 | P105 |
| ⋮ | ⋮ |

USER MENU

BASIC COPYING | BASIC SCANNING | BASIC FAX

USER MENU

BASIC COPYING | ANYWHERE PRINTING FOR PRESENTATIONS | ONE-TOUCH COPYING

FIG. 10  USER ID: 1234

BOND PAPER         : WITH LIMITED USE
POST-PROCESSING    : WITH LIMITED USE
COLOR PRINTING     : WITH LIMITED USE

FIG.12
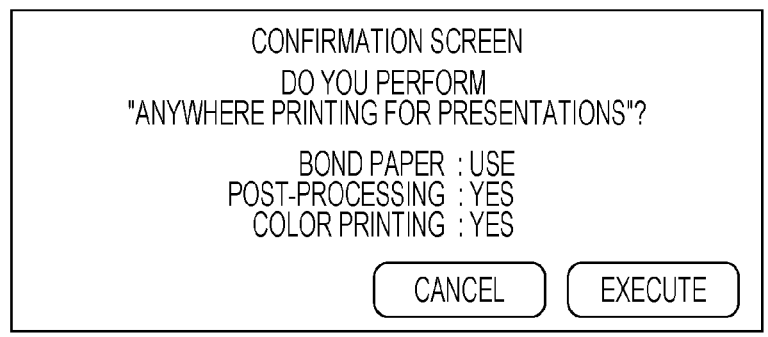
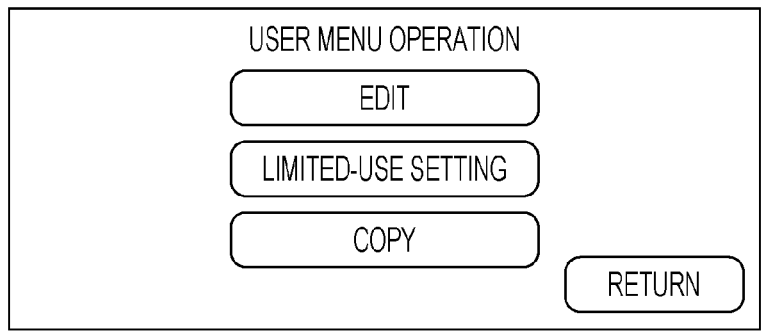
FIG.13A
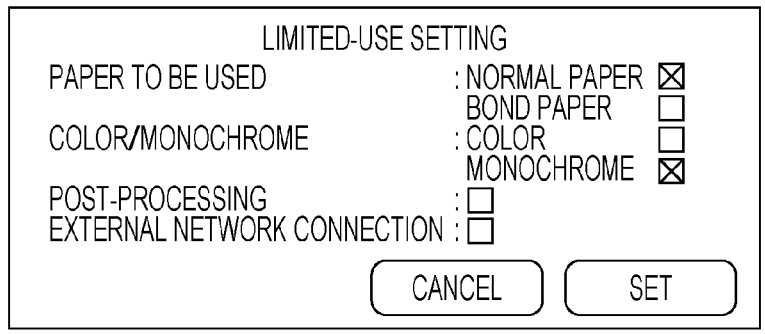
FIG.13B
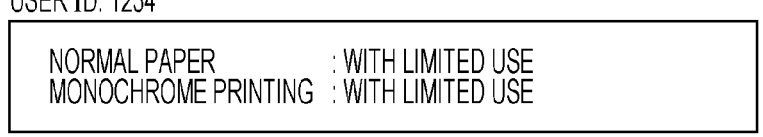
FIG.13C

PROCESSING INSTRUCTION DEVICE, PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-115829 filed May 31, 2013.

BACKGROUND (i) Technical Field

The present invention relates to a processing instruction device, a processing apparatus, and a non-transitory computer readable medium.

(ii) Related Art

Some of various processing apparatuses, for example, image forming apparatuses such as printers, imaging apparatuses such as scanners, data communication apparatuses such as facsimile machines, or multi-functional apparatuses having these functions integrated into single units, have a function to display a menu for prompting a user to select one of multiple processing operations executable thereon.

SUMMARY

According to an aspect of the invention, there is provided a processing instruction device including a memory, a display instruction data acquisition unit, a display controller, an operation data acquisition unit, and a processing instruction unit. The memory stores management data and condition data. The management data includes one or more pieces of processing instruction data, processing identification data identifying the processing instruction data, and processing attribute data indicating an attribute of a processing operation indicated by the processing instruction data. Each of the one or more pieces of processing instruction data is data for instructing at least one of an image forming device, an imaging device, and a data communication device to perform a processing operation. The condition data indicates a condition in which processing operations are classified into a first group and a second group based on attributes of the processing operations. The display instruction data acquisition unit acquires display instruction data. The display instruction data includes processing identification data identifying each of one or more pieces of processing instruction data selected from among the one or more pieces of processing instruction data. The display instruction data is data for giving an instruction to display an image including an operator corresponding to each of the one or more pieces of processing instruction data selected from among the one or more pieces of processing instruction data. The display controller causes a display device to display an image in accordance with the display instruction data. The operation data acquisition unit acquires operation data indicating an operation of a user from an operation device that receives a user operation. The processing instruction unit instructs at least one of the image forming device, the imaging device, and the data communication device to perform a processing operation, in a case where the operation data acquisition unit acquires operation data indicating an operation on one of one or more operators included in an image while the image is being displayed on the display device, in accordance with processing instruction data corresponding to the one operator. The display controller causes the display device to display an image in accordance with the display instruction data in such a manner that, in accordance with the condition data based on an attribute indicated by the processing attribute data included in the management data, an operator corresponding to a processing operation classified into the first group is displayed on the display device in a different display format from an operator corresponding to a processing operation classified into the second group or an operator corresponding to a processing operation classified into the first group is displayed on the display device and an operator corresponding to a processing operation classified into the second group is not displayed on the display device.

BRIEF DESCRIPTION OF THE DRAWINGS

An exemplary embodiment of the present invention will be described in detail based on the following figures, wherein:

FIG. 4 illustrates a functional configuration of a processing instruction device according to the exemplary embodiment;

FIG. 5 illustrates management data according to the exemplary embodiment;

FIG. 6 illustrates default display instruction data according to the exemplary embodiment;

FIG. 7 illustrates user-classified display instruction data according to the exemplary embodiment;

FIG. 10 illustrates condition data according to the exemplary embodiment;

FIG. 12 illustrates screens displayed by the processing apparatus according to the exemplary embodiment;

FIGS. 13A to 13C illustrate screens displayed by the processing apparatus according to the exemplary embodiment and condition data;

DETAILED DESCRIPTION

A data processing system 1 according to an exemplary embodiment of the present invention will be described hereinafter. The data processing system 1 includes multiple processing apparatuses, and each of the multiple processing apparatuses provides a user with multiple functions such as printing, scanning, copying, and facsimile (FAX) functions.

In each of the processing apparatuses included in the data processing system 1, a user menu screen (an image used as a user interface customized by a user to select a processing operation) is available. A user is able to set the individual settings to a user menu screen on each of the multiple processing apparatuses. However, the setting operation is time-consuming. In the data processing system 1, therefore, data indicating a user menu screen set by a user on a certain processing apparatus may be utilized on another processing apparatus. Accordingly, once a user sets the settings to a user menu screen on one of the processing apparatuses, the user may also be able to utilize the user menu screen on the other processing apparatuses without setting the individual settings to the user menu screen.

Figures 1, 2:
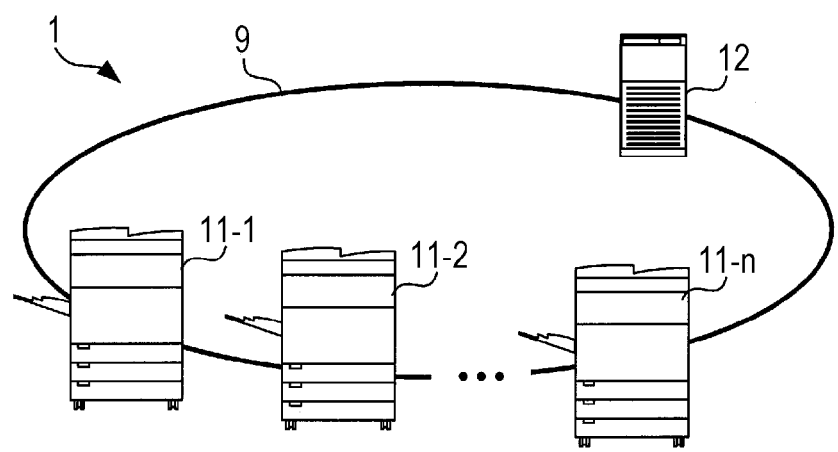
FIG. 1 illustrates an overall configuration of a data processing system according to an exemplary embodiment.
FIG. 2 illustrates a data configuration of a user authentication table according to the exemplary embodiment.

FIG. 1 illustrates an overall configuration of the data processing system 1. The data processing system 1 includes n processing apparatuses (where n is a natural number), namely, processing apparatuses 11-1, 11-2, ..., and 11-$n$, and an authentication server device 12. In the following description, the multiple processing apparatuses included in the data processing system 1 are collectively referred to as "processing apparatuses 11" or are each referred to as a "processing apparatus 11" unless they are distinguished from one another. Each of the processing apparatuses 11 may perform data communication with the authentication server device 12 via a network 9.

Each of the processing apparatuses 11 includes, for example, an image forming device, an imaging device, a data communication device, and so forth, and is configured to cause these devices to operate in association with one another to provide a user with various functions such as printing, scanning, copying, and facsimile (fax) functions. The same user may be able to use the multiple processing apparatuses 11.

The authentication server device 12 is a server device that serves to authenticate a user and to notify a processing apparatus 11 of functions available to the authenticated user among the various functions provided by the processing apparatus 11.

FIG. 2 illustrates a data configuration of a user authentication table managed by the authentication server device 12. The user authentication table is a collection of data records each relating to one of multiple users who use the data processing system 1, and each data record has data fields "user ID", "authentication code", and "privilege data".

The data field "user ID" stores user IDs each identifying a user. The data field "authentication code" stores authentication codes each of which is data uniquely assigned to a user and used with the user ID to verify the identity of the user. The data processing system 1 adopts a mechanism in which a user ID and an authentication code are stored in a near field communication (NFC) card possessed by a user and the user places the NFC card on or holds the NFC card above a processing apparatus 11, thereby allowing the processing apparatus 11 to read the user ID and the authentication code and transmit them to the authentication server device 12. The authentication server device 12 searches the user authentication table for the combination of user ID and authentication code which is transmitted from the processing apparatus 11, and determines, based on the success or failure of the search, whether the authentication of the user is successful or not.

The data field "privilege data" stores privilege data indicating functions available or not available to the corresponding user. The privilege data may be data indicating, for example, "color copying function: not available", "scanning function: available", "fax function: not available", "number of copies allowed: up to 50 per action", and so forth. If the authentication of the user is successful, the authentication server device 12 transmits the privilege data stored in the retrieved data record to the processing apparatus 11. The processing apparatus 11 may specify the function that the user is authorized to use on the basis of the privilege data transmitted from the authentication server device 12.

Figure 3:
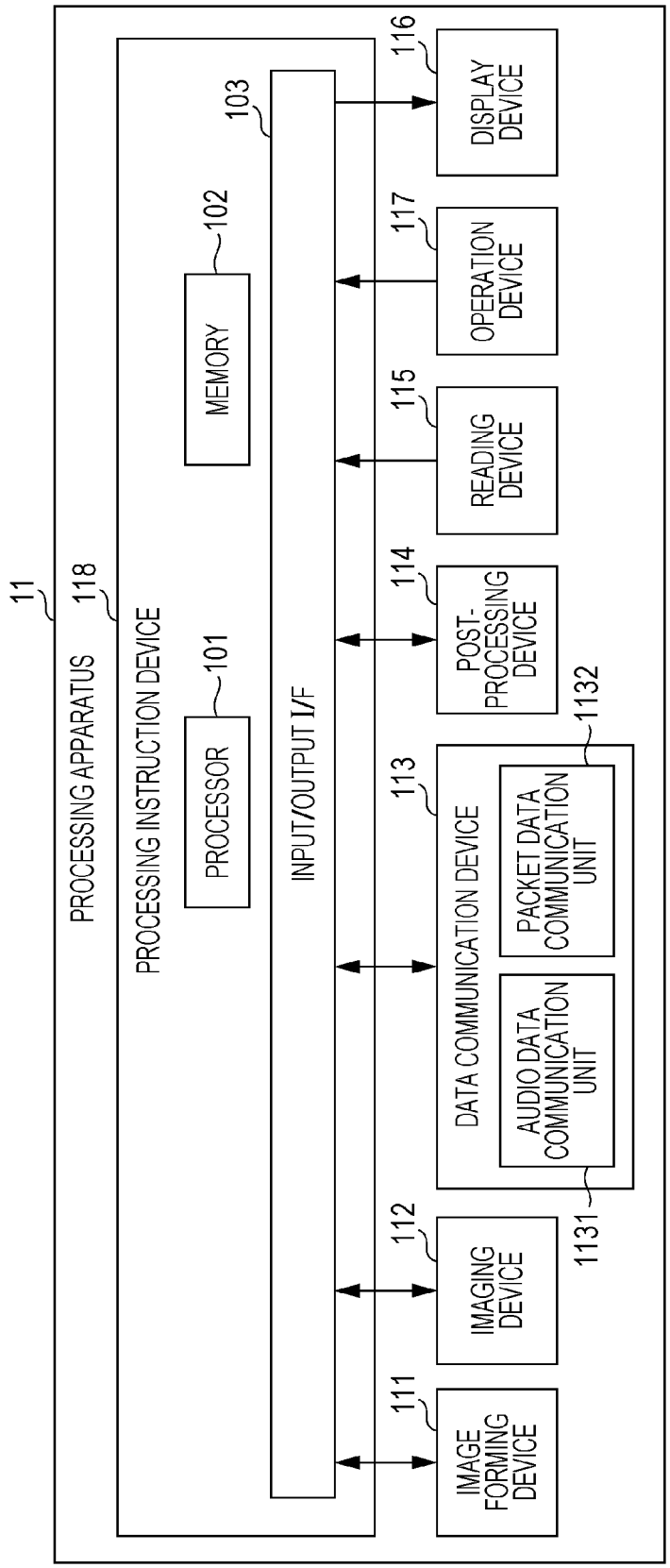
FIG. 3 illustrates a hardware configuration of a processing apparatus according to the exemplary embodiment.

FIG. 3 illustrates a hardware configuration of a processing apparatus 11. The processing apparatus 11 includes an image forming device 111, an imaging device 112, a data communication device 113, a post-processing device 114, a reading device 115, a display device 116, an operation device 117, and a processing instruction device 118.

The image forming device 111 is a device configured to form an image on a sheet-shaped recording medium such as a sheet of paper using, for example, electrophotography. The printing method of the image forming device 111 is not limited to electrophotography, and any other method such as an inkjet printing method may be used.

The imaging device 112 is a device configured to optically read an image formed on a sheet-shaped recording medium placed on a document table to generate image data indicating the image.

The data communication device 113 is a device configured to transmit and receive various data to and from an external device. The data communication device 113 includes an audio data communication unit 1131 that performs audio data communication with an external facsimile (fax) device or the like via a telephone communication network, and a packet data communication unit 1132 that performs packet data communication with another processing apparatus 11, the authentication server device 12, or the like via a packet data network.

The post-processing device 114 is a device configured to perform processing operations, such as folding, hole punching, and stapling, on sheet-shaped recording media on which images have been formed by the image forming device 111.

The reading device 115 is a device (card reader) configured to read the user ID and authentication code recorded on an NFC card that is placed on or held above the reading device 115 by a user in accordance with the NFC standard. When a user brings an NFC card to the reading device 115 in a shorter distance than, for example, approximately 5 centimeters, the NFC card starts wireless communication by electric power induced by an electromagnetic wave emitted from the reading device 115, and transmits the user ID and the authentication code to the reading device 115 via radio transmission. The reading device 115 receives the user ID and authentication code transmitted from the NFC card to read the data recorded on the NFC car.

The display device 116 may be, for example, a liquid crystal display, and is configured to display various images such as a user menu screen. The operation device 117 may be, for example, a touch panel, and is configured to receive a touch operation performed by a user and generate operation data indicating the content of the touch operation. In the processing apparatus 11, the display device 116 and the operation device 117 may be stacked on each other to form a touch display. A user touches an image of an operator displayed on the display device 116 to experience intuitive interactions with the processing apparatus 11.

The processing instruction device 118 is a device configured to instruct the image forming device 111, the imaging device 112, the data communication device 113, or the post-processing device 114 to execute the function selected by the user in accordance with a user operation on the operation device 117. The processing instruction device 118 includes a processor 101 configured to perform various data processing operations, a memory 102 configured to store various data, and an input/output interface (I/F) 103 configured to input and output various data to and from the other devices included in the processing apparatus 11. The processor 101 performs various data processing operations in accordance with a program stored in the memory 102, thereby serving as a device including the components described below.

FIG. 4 illustrates a functional configuration of the processing instruction device 118. In FIG. 4, the devices included in the processing apparatus 11, other than the processing instruction device 118, are also illustrated in order to demonstrate relationships between transmission and reception of data between the processing instruction device 118 and the other devices included in the processing apparatus 11.

The processing instruction device 118 includes, as functional components, a memory 1171, a display instruction data acquisition unit 1172, a display controller 1173, an operation data acquisition unit 1174, a processing instruction unit 1175, and a user identification data acquisition unit 1176.

The memory 1171 stores data to be used by the processing instruction device 118 to instruct the image forming device 111 and the like to perform various processing operations. Specifically, the memory 1171 stores management data, display instruction data, and condition data. The management data is data for managing multiple processing operations executable by the processing apparatus 11. The display instruction data is data for giving an instruction to display a user menu screen. The condition data is data indicating conditions for determining which of two groups the multiple processing operations executable by the processing apparatus 11 are to be classified into. The two groups into which the processing operations are classified in accordance with the conditions indicated by the condition data are specifically a first group and a second group. The first group includes processing operations that are appropriate for the processing apparatus 11 which stores the condition data to execute. The second group includes processing operations that are not necessarily appropriate for the processing apparatus 11 which stores the condition data to execute.

FIG. 5 illustrates the management data stored in the memory 1171. The management data is a collection of data records each relating to a processing operation executable by the processing apparatus 11. Each data record has data fields "processing ID", "processing name", "processing attribute", and "processing instruction data".

The data field "processing ID" stores processing IDs each identifying a processing operation. The data field "processing name" stores processing names, for example, "basic copying".

The data field "processing attribute" stores attribute data indicating attributes such as parameters used in processing operations. In FIG. 5, the attributes "Paper to be used: Normal paper", "Color/monochrome: Monochrome", "Post-processing: No", and "External network connection: No" are illustrated using attribute data for the processing operation "one-touch copying". The processing operation "one-touch copying" is a processing operation for copying onto normal paper in black and white, and may be used, for example, when a user wishes to quickly copy documents for in-house use.

In FIG. 5, the attributes "Paper to be used: Bond paper", "Color/monochrome: Color", "Post-processing: Yes", and "External network connection: Yes" are further illustrated using attribute data for the processing operation "anywhere printing for presentations". The processing operation "anywhere printing for presentations" is a processing operation for, for example, downloading data specified by a user from an external data distribution server device (not illustrated in FIG. 1) via the network 9, printing a document onto sheets of bond paper in a color mode using the downloaded data, and stapling the sheets or performing any other suitable operation. This processing operation is used, for example, when a user prepares materials and the like to be delivered to a client.

The data stored in the data fields "processing name" and "processing attribute" is data that is written by, for example, the author or other person of the processing instruction data as metadata accompanied by the data field "processing instruction data" in the same data record, and that is registered in the management data.

The data field "processing instruction data" stores processing instruction data indicating the specific procedure or the like of the processing operations. The processing instruction data may be, for example, a code list for invoking a program installed in the processing apparatus 11. The form of the processing instruction data is not limited to code list, and, for example, a program itself may be handled as processing instruction data.

FIGS. 6 and 7 illustrate the display instruction data stored in the memory 1171. The display instruction data illustrated in FIG. 6 is data for giving an instruction to display a default menu screen that is not editable by the user. In contrast, the display instruction data illustrated in FIG. 7 is display instruction data that is obtained by editing the display instruction data illustrated in FIG. 6 by each individual user for customization, and is generated for each user. Thus, the display instruction data illustrated in FIG. 7 is associated with a user ID identifying the corresponding user.

Hereinafter, the display instruction data illustrated in FIG. 6 is referred to as "default display instruction data", and the display instruction data illustrated in FIG. 7 is referred to as "user-classified display instruction data". In addition, the default display instruction data and the user-classified display instruction data are each hereinafter referred to simply as "display instruction data" unless they are individually identified or if the user-classified display instruction data is clearly determined by the context. Furthermore, a screen displayed regardless of the difference in users in accordance with the default display instruction data is hereinafter referred to as a "default menu screen" in order to distinguish it from a user menu screen that is a screen displayed for each user in accordance with user-classified display instruction data. Moreover, the default menu screen and the user menu screen are each hereinafter referred to simply as a "menu screen" unless they are individually identified.

The display instruction data is a collection of data records each relating to one of multiple selection buttons (operators) displayed on a menu screen, and each data record has data fields "display position" and "processing ID".

The data field "display position" stores display position IDs each identifying the display position of a selection button on the menu screen. For example, the display position ID "1" indicates the leftmost position on the first page of the menu screen. The data records included in the display instruction data are sorted in ascending order by the values in the data field "display position".

The data field "processing ID" stores IDs each identifying processing instruction data to be executed when the user operates a selection button displayed at a display position identified by the data field "display position" in the same data record.

Figure 8:
FIG. 8 illustrates screens displayed by the processing apparatus according to the exemplary embodiment.
Figure 9:
FIG. 9 illustrates screens displayed by the processing apparatus according to the exemplary embodiment.

FIG. 8 illustrates the default menu screen displayed on the processing apparatus 11 in accordance with the default display instruction data illustrated in FIG. 6. FIG. 9 illustrates the user menu screen displayed on the processing apparatus 11 in accordance with the user-classified display instruction data illustrated in FIG. 7. The menu screens illustrated in FIG. 8 and FIG. 9 are menu screens whose display formats have not been changed in accordance with the following condition data.

FIG. 10 illustrates the condition data stored in the memory 1171. Since condition data is generated for each user, the condition data is associated with a user ID identifying the corresponding user.

The condition data is data indicating the conditions which are set by the user in order to limit the use of the processing apparatus 11 which stores the condition data. Specifically, the condition data is data for specifying any of the attributes which may be indicated by the attribute data stored in the data field "processing attribute" in the management data (FIG. 5), and for giving an instruction to classify the processing operation including the specified attribute into the second group as a processing operation to be limited (a processing operation that it is not necessarily desirable to execute).

In the example illustrated in FIG. 10, the condition data gives an instruction to classify a processing operation which uses bond paper as a processing operation to be limited, classify a processing operation for post-processing as a processing operation to be limited, and classify a processing operation for color printing as a processing operation to be limited.

Referring back to FIG. 4, the description of the functional configuration of the processing instruction device 118 will be continued. The display instruction data acquisition unit 1172 acquires user-classified display instruction data from another processing apparatus 11 when the user operates the operation device 117 to make an instruction to copy display instruction data.

The procedure for acquiring the display instruction data by the display instruction data acquisition unit 1172 will be specifically as follows: First, the display instruction data acquisition unit 1172 generates a transmission request of display instruction data. The transmission request includes a user ID. The user ID is read by the reading device 115 from the NFC card of the user who is using the processing apparatus 11, and is acquired by the user identification data acquisition unit 1176 from the reading device 115.

The display instruction data acquisition unit 1172 instructs the packet data communication unit 1132 of the data communication device 113 to transmit the generated transmission request to another processing apparatus 11. In accordance with the instruction from the display instruction data acquisition unit 1172, the packet data communication unit 1132 transmits the transmission request to another processing apparatus 11, and receives display instruction data from the other processing apparatus 11 in response to the transmission request. The display instruction data received by the packet data communication unit 1132 is user-classified display instruction data that is stored, in association with the user ID included in the transmission request, in the destination processing apparatus 11 to which the transmission request has been transmitted.

The packet data communication unit 1132 delivers the user-classified display instruction data received from the other processing apparatus 11 to the display instruction data acquisition unit 1172. The display instruction data acquisition unit 1172 stores in the memory 1171 the user-classified display instruction data acquired from the other processing apparatus 11 via the packet data communication unit 1132 (or, if the user-classified display instruction data corresponding to the same user has been stored, overwrites the stored user-classified display instruction data).

The display controller 1173 instructs the display device 116 to display a user menu screen in accordance with the user-classified display instruction data stored in the memory 1171. However, if the number of selection buttons corresponding to the processing operations to be classified into the second group among the selection buttons included in the user menu screen displayed in accordance with the user-classified display instruction data stored in the memory 1171 is less than or equal to a predetermined threshold value (for example, "1"), the display controller 1173 instructs the display device 116 to display the default menu screen in accordance with the default display instruction data instead of the user-classified display instruction data.

If a selection button corresponding to a processing operation to be classified into the second group among the selection buttons displayed on the menu screen is operated by the user, the display controller 1173 instructs the display device 116 to display a confirmation screen for prompting the user to confirm that they would like to execute this processing operation. The display controller 1173 also instructs the display device 116 to display various screens other than the menu screen and the confirmation screen.

When the user touches the screen currently being displayed on the display device 116, such as a user menu screen, in accordance with the display controller 1173, the operation data acquisition unit 1174 receives operation data indicating the touch operation from the operation device 117.

If the operation data acquisition unit 1174 acquires operation data indicating the operation on the selection button corresponding to a processing operation to be classified into the first group among the selection buttons displayed on the menu screen, the processing instruction unit 1175 instructs the image forming device 111, the imaging device 112, the data communication device 113, the post-processing device 114, or the like to execute the processing operation in accordance with the processing instruction data corresponding to the selection button on which the operation indicated by the operation data has been performed.

The user identification data acquisition unit 1176 acquires from the reading device 115 the user ID read by the reading device 115 from the NFC card.

The foregoing description has been directed to the functional configuration of the processing instruction device 118. The operation of the data processing system 1 will now be described with reference to an example of screens displayed on the display device 116 in accordance with an instruction given by the display controller 1173 of the processing instruction device 118.

Figure 11A:
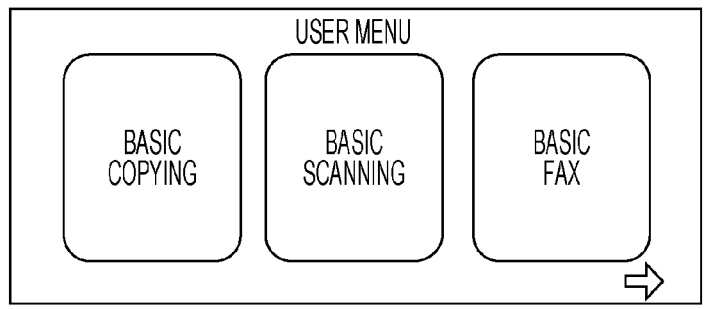
FIGS. 11A to 11E illustrate screens displayed by the processing apparatus according to the exemplary embodiment.
Figure 11B:
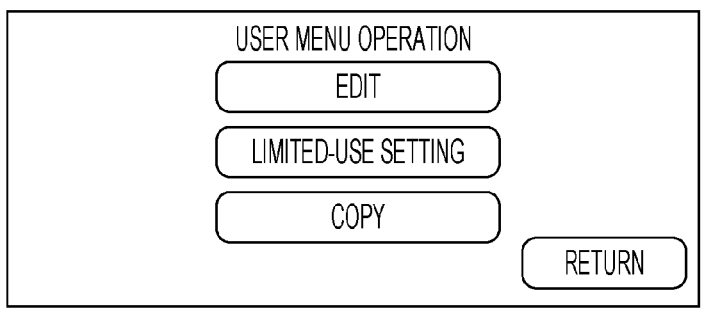

FIGS. 11A to 11E illustrate screens displayed on the display device 116 of the processing apparatus 11 when the user is to edit the user menu screen. FIG. 11A illustrates a default user menu screen. The default user menu screen is identical to the default menu screen illustrated in FIG. 8. That is, a copy of the default display instruction data (FIG. 6) is used as the initial value of the user-classified display instruction data (FIG. 7).

For example, the user wishes to edit the default user menu screen. In this case, the user performs a predetermined operation on the operation device 117 to display a user menu operation screen (FIG. 11B) on the display device 116. When the user operates an "Edit" button on the user menu operation screen, a user menu edit screen (FIG. 11C) is displayed on the display device 116.

Figure 11C:
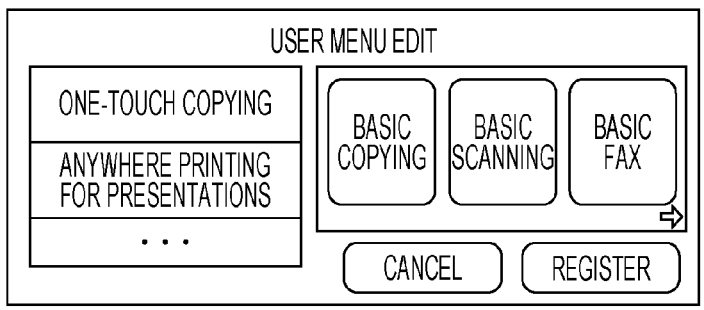
Figure 11D:
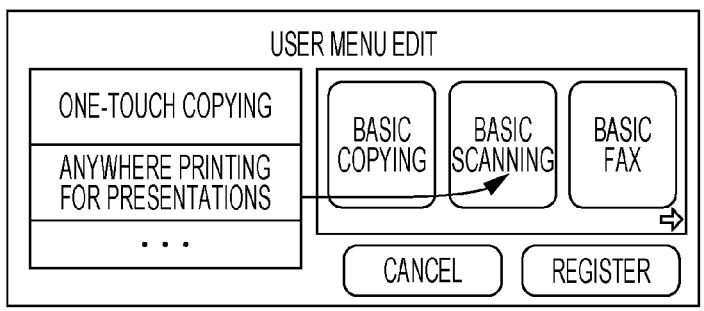

On the user menu edit screen, the processing names of processing operations available on the processing apparatus 11 are displayed as a list (left portion of FIG. 11C). The processing names displayed in the list are the processing names stored in the data field "processing name" in the management table (FIG. 5). The user drags the processing name of the processing operation for which the selection button is to be displayed on the user menu screen to the desired position in the frame in the right portion (design area) from the list (FIG. 11D), thereby being able to edit the design of the user menu screen.

The user repeatedly drags processing names to the design area from the list, if necessary. When the editing of the user menu screen is completed, the user operates a "Register" button to complete the editing of the user menu screen. In response to the operation of the "Register" button, the processing instruction device 118 updates the user-classified display instruction data (FIG. 7) so as to give an instruction to display the user menu screen edited by the user.

Thereafter, when the user performs a predetermined operation on the operation device 117, the display controller 1173 of the processing instruction device 118 searches the management data (FIG. 5) for a data record storing the processing ID that matches the processing ID stored in each of the data records included in the user-classified display instruction data (FIG. 7) stored in the memory 1171, and reads the attribute data stored in the data field "processing attribute" in the retrieved data record.

If any of the attributes of the processing operation indicated by the read attribute data is included in the limited-use attributes in the condition data (FIG. 10), the display controller 1173 classifies this processing operation into the second group. If none of the attributes of the processing operation indicated by the read attribute data is included in the limited-use attributes in the condition data, the display controller 1173 classifies the processing operation into the first group.

Then, the display controller 1173 instructs the display device 116 to display a user menu screen in accordance with user-classified display instruction data. In this case, the display controller 1173 instructs the display device 116 to display selection buttons corresponding to processing operations to be classified into the second group in a different display format from selection buttons corresponding to processing operations to be classified into the first group. As a result, a user menu screen illustrated in FIG. 11E is displayed on the display device 116.

Figure 11E:
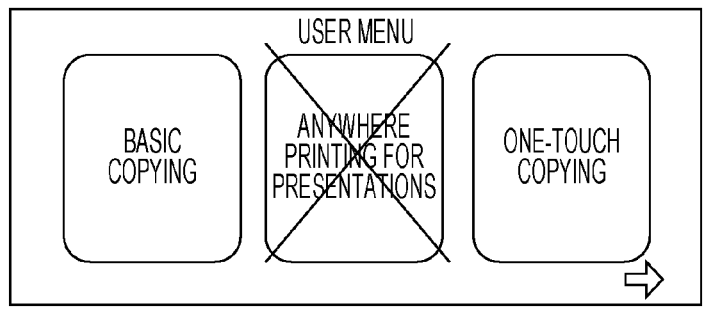

The selection button displayed in the center of the user menu screen illustrated in FIG. 11E is marked with a cross ("x"), which may allow a user to easily understand that the center selection button is a selection button indicating a processing operation for limited use.

When the user operates a selection button that is not marked with a cross ("x") on the user menu screen, that is, a selection button corresponding to a processing operation to be classified into the first group (or a processing operation for non-limited use), the processing instruction unit 1175 specifies the operated selection button using the operation data delivered from the operation device 117 via the operation data acquisition unit 1174, and reads the processing instruction data corresponding to the specified selection button from the processing table stored in the memory 1171. Then, the processing instruction unit 1175 instructs another device such as the image forming device 111 to perform the processing operation in accordance with the read processing instruction data. The image forming device 111 or the like executes the processing operation in accordance with the instruction, thereby providing a service to the user.

On the other hand, if the user operates a selection button marked with a cross ("x") on the user menu screen, that is, a selection button corresponding to a processing operation to be classified into the second group (or a processing operation for limited use), the processing instruction unit 1175 specifies the operated selection button using the operation data delivered from the operation device 117 via the operation data acquisition unit 1174, suspends the execution of the processing operation in accordance with the processing instruction data corresponding to the specified selection button, and notifies the display controller 1173 of the suspension of the processing operation. Upon receiving the notification of the suspension of the processing operation from the processing instruction unit 1175, the display controller 1173 instructs the display device 116 to display a confirmation screen.

FIG. 12 illustrates a confirmation screen. On the confirmation screen, the processing name of the processing operation corresponding to the selection button operated by the user, and the limited-use attributes among the attributes of the processing operation are displayed. The user checks the content of the displayed items, and operates an "Execute" button if the user wishes to execute this processing operation. When the user operates the "Execute" button, the processing instruction unit 1175 executes the suspended processing operation in accordance with the operation data (operation data indicating the operation for which the "Execute" button has been enabled) delivered from the operation device 117 via the operation data acquisition unit 1174. As a result, the processing operation corresponding to the selection button operated by the user is executed by the image forming device 111 or the like, and a service is provided to the user.

On the other hand, if the user operates a "Cancel" button on the confirmation screen, the processing instruction unit 1175 stops the execution of the suspended processing operation in accordance with the operation data (operation data indicating the operation for which the "Cancel" button has been enabled) delivered from the operation device 117 via the operation data acquisition unit 1174. As a result, the processing operation corresponding to the selection button marked with a cross ("x"), which has been operated by the user on the user menu screen, is not executed by the image forming device 111 or the like.

FIGS. 13A to 13C illustrate screens displayed on the display device 116 of the processing apparatus 11 when the user is to set condition data in the processing apparatus 11, and the condition data set through the screens. When the user wishes to set a limited-use setting for a specific processing attribute for the processing apparatus 11 (or wishes to release the limited-use setting set for a specific processing attribute, the user performs a predetermined operation on the operation device 117 to cause a user menu operation screen (FIG. 13A) to be displayed on the display device 116. When the user operates a "Limited-use setting" button on the user menu operation screen, a limited-use setting screen (FIG. 13B) is displayed on the display device 116.

On the limited-use setting screen, the names of the processing attributes for which a limited-use setting is enabled are displayed together with checkboxes. When the user checks the checkbox of the processing attribute for which a limited-use setting is to be set on the limited-use setting screen or unchecks the checkbox of the processing attribute for which the set limited-use setting is to be released, and then operates a "Set" button. Thus, the processing instruction device 118 generates condition data for setting a limited-use setting for the processing attribute checked by the user, and stores the generated condition data in the memory 1171. FIG. 13C illustrates the condition data generated by and stored in the processing instruction device 118 when the "Set" button is operated on the limited-use setting screen illustrated by way of example in FIG. 13B.

As described above, in the data processing system 1, a user menu screen similar to a user menu screen displayed on one processing apparatus 11 may be available on another processing apparatus 11 (hereinafter referred to as "copying of a user menu screen", for convenience of description).

The operation of the data processing system 1 involved in copying a user menu screen from the processing apparatus 11-1 to the processing apparatus 11-2, by way of example, will be described hereinafter. In the following description, for the user who is to copy a user menu screen (the user identified by the user ID "1234"), the user-classified display instruction data illustrated in FIG. 7 and the condition data illustrated in FIG. 10 are stored in the processing apparatus 11-1. In addition, the user-classified display instruction data having the initial values (a copy of the default display instruction data illustrated in FIG. 6) and the condition data illustrated in FIG. 13C are stored in the processing apparatus 11-2.

Figure 14A:
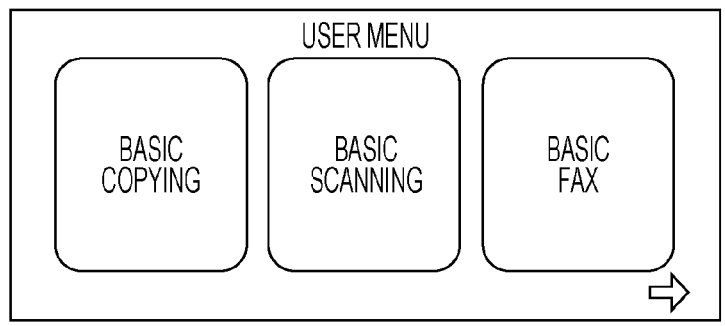
FIGS. 14A to 14D illustrate screens displayed by the processing apparatus according to the exemplary embodiment.

FIGS. 14A to 14D illustrate screens displayed on the display device 116 of the processing apparatus 11-2, which is the destination processing apparatus 11 to which the user menu screen is to be copied in the copying operation. When the user sends an instruction to the processing apparatus 11-2 to display a user menu screen, a default user menu screen illustrated in FIG. 14A is displayed on the display device 116.

Figure 14B:
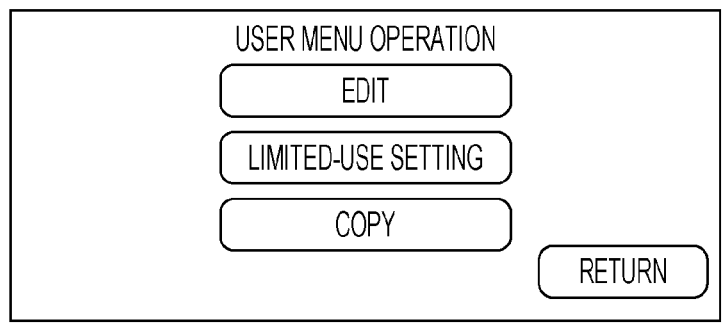
Figure 14C:
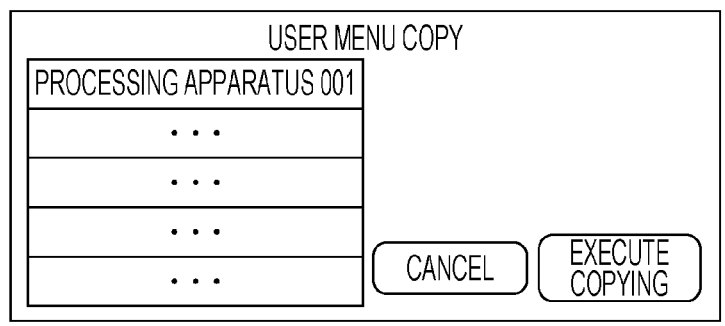

When the user wishes to use, instead of the default user menu screen, a copy of a user menu screen that has been edited using another processing apparatus 11, the user operates a "Copy" button on the user menu operation screen (FIG. 14B). In response to this operation, a user menu copy screen (FIG. 14C) is displayed on the display device 116. On the user menu copy screen, the names of the other processing apparatuses 11 included in the data processing system 1 are displayed as a list (left portion).

When the user selects the name of the processing apparatus 11-1, which is the source from which the user menu screen is to be copied, from the list and then operates an "Execute copying" button, the display instruction data acquisition unit 1172 of the processing instruction device 118 acquires display instruction data from the processing apparatus 11-1 selected by the user via the packet data communication unit 1132, and stores the display instruction data in the memory 1171.

Figure 14D:
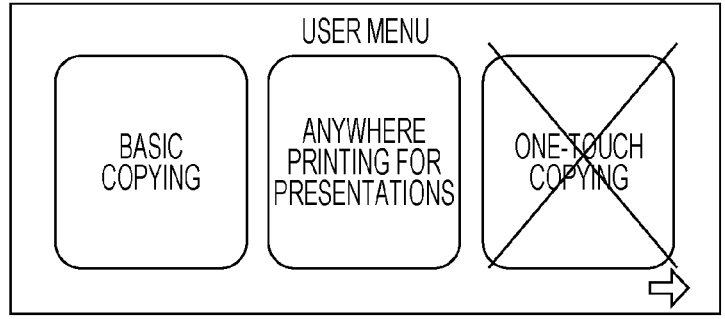

Then, when the user sends an instruction to the processing apparatus 11-2 to display a user menu screen, a user menu screen illustrated in FIG. 14D is displayed on the display device 116. The user menu screen illustrated in FIG. 14D and the user menu screen illustrated in FIG. 11E are user menu screens displayed in accordance with the same user-classified display instruction data, or the user-classified display instruction data illustrated in FIG. 7, and therefore have a common arrangement of the selection buttons.

In the user menu screen illustrated in FIG. 11E, however, the processing operation to be classified into the second group is distinguished from the others in accordance with the condition data illustrated in FIG. 10. In the user menu screen illustrated in FIG. 14D, by contrast, the processing operation to be classified into the second group is distinguished from the others in accordance with the condition data illustrated in FIG. 13C. As a result, the selection buttons marked with a cross ("x") in these user menu screens are different. This may avoid an inconvenience that the user might inadvertently execute a processing operation with limited use in each of the processing apparatus 11-1 and the processing apparatus 11-2 in a case where the processing apparatus 11-1 and the processing apparatus 11-2 provide different processing operations with limited use.

Figure 15A:
FIGS. 15A to 15C illustrate condition data and screens displayed by the processing apparatus according to the exemplary embodiment.
Figure 15B:
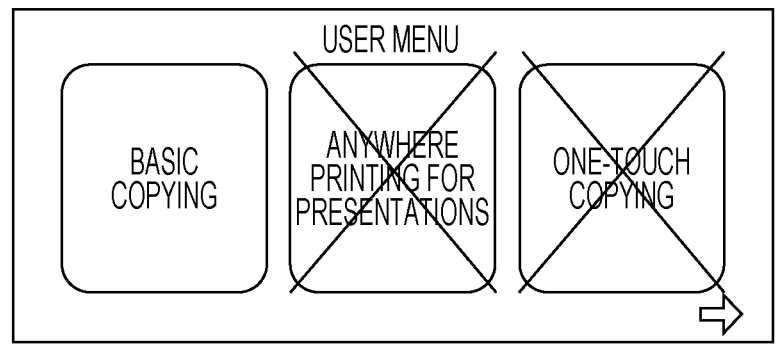
Figure 15C:
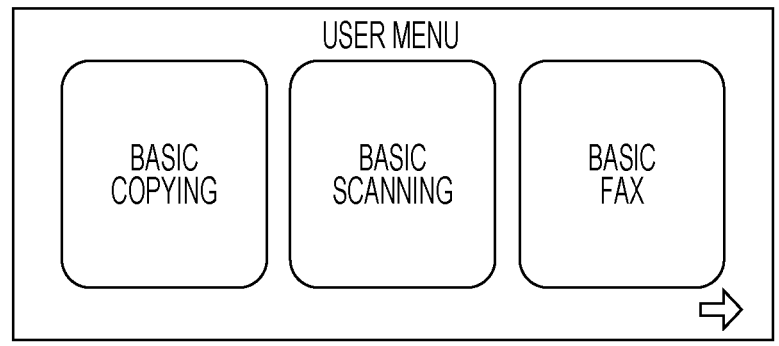

FIGS. 15A to 15C illustrate the operation of a processing apparatus 11 to display the default menu screen instead of the user menu screen. For example, the user sets condition data illustrated in FIG. 15A for the processing apparatus 11-2. In this case, a user menu screen illustrated in FIG. 15B is displayed in accordance with user-classified display instruction data.

In the illustrated example, two out of the three selection buttons displayed on the user menu screen are assigned a mark indicating limited use. These two selection buttons are less frequently used, and, additionally, every time theses selection buttons are used, the user is required to perform a confirmation operation through the confirmation screen (FIG. 12). Thus, displaying the user menu screen illustrated in FIG. 15B will inconvenience the user.

In the data processing system 1, however, as described above, if the number of selection buttons corresponding to the processing operations to be classified into the first group which are displayed on a user menu screen is less than or equal to a threshold value (in the example in FIGS. 15A to 15C, "1"), the display controller 1173 gives an instruction to display a menu screen in accordance with the default display instruction data instead of the user-classified display instruction data. As a result, a default menu screen illustrated in FIG. 15C is displayed on the display device 116. This may avoid inconvenience to the user, which may cause by display of a user menu screen including a number of selection buttons for the processing operations assigned a mark indicating limited use.

EXEMPLARY MODIFICATIONS

The present invention is not limited to the foregoing exemplary embodiment, and a variety of modifications may be made. Some exemplary modifications will be given hereinafter. Two or more of the following exemplary modifications may be used in combination.

First Exemplary Modification

In the foregoing exemplary embodiment, in order to share display instruction data (user-classified display instruction data) between multiple processing apparatuses 11, a user operates the destination processing apparatus 11 to which the display instruction data is to be copied to acquire display instruction data from the source processing apparatus 11. However, the method for sharing display instruction data between multiple processing apparatuses 11 is not limited to the method described above. For example, a management server device configured to manage display instruction data on a user-by-user basis may be provided, and each processing apparatus 11 may acquire display instruction data associated with each individual user from the management server device to share display instruction data between the multiple processing apparatuses 11. Alternatively, for example, each time a predetermined time period has elapsed, each processing apparatus 11 may broadcast display instruction data stored therein to other processing apparatuses 11, and, upon receiving new display instruction data broadcast from another processing apparatus 11, update the display instruction data stored therein using the received display instruction data so that the display instruction data stored in each of the multiple processing apparatuses 11 may be synchronized with the display instruction data stored in the other processing apparatuses 11.

Second Exemplary Modification

In the foregoing exemplary embodiment, user authentication is performed by checking the user ID and authentication code recorded on an NFC card against those in the authentication server device 12. The user authentication method is not limited to that described above, and any other method may be used to authenticate a user. For example, the user may input a user ID and a password to the operation device 117, and the input data may be checked against that in the authentication server device 12. In addition, the location where verification for authentication is to be performed is not limited to the authentication server device 12. For example, each of the processing apparatuses 11 may store a user authentication table, and may perform verification for authentication.

Third Exemplary Modification

In the foregoing exemplary embodiment, user-edited menu screens are used on a user-by-user basis in accordance with user-classified display instruction data. A custom menu screen which is commonly available to all users may be used instead of or in addition to a user menu screen.

Fourth Exemplary Modification

In the foregoing exemplary embodiment, condition data is managed on a user-by-user basis. Alternatively, condition data which is commonly available to all users may be set for each of the processing apparatuses 11.

Fifth Exemplary Modification

In the foregoing exemplary embodiment, the processing instruction device 118 is integrated with other devices such as the image forming device 111 into the processing apparatus 11. Alternatively, the processing instruction device 118 may be formed as a device independent of the processing apparatus 11. For example, a computer such as a slate personal computer (PC) having a touch display may be caused to execute processing in accordance with the program according to the exemplary embodiment disclosed herein, thereby causing the computer to function as the processing instruction device 118. In this case, a processing apparatus 11 which does not include the processing instruction device 118 and the processing instruction device 118 implemented by the computer may communicate data to each other via wired or wireless connections.

Sixth Exemplary Modification

In the foregoing exemplary embodiment, each of the processing apparatuses 11 includes the image forming device 111, the imaging device 112, the data communication device 113, and the post-processing device 114. However, each of the processing apparatuses 11 may have any other device configuration. For example, each of the processing apparatuses 11 may not necessarily include some of these devices, and may further include any additional device. Alternatively, instead of the processing apparatuses 11, any other type of device may be used. That is, any processing apparatus capable of executing multiple processing operations and configured to execute a processing operation selected by a user from among the multiple processing operations may be used.

Seventh Exemplary Modification

In the foregoing exemplary embodiment, the processing instruction device 118 is implemented by the processor 101 performing processing in accordance with a program. The processing instruction device 118 may be formed as a dedicated device.

Eighth Exemplary Modification

In the foregoing exemplary embodiment, on a menu screen, a selection button corresponding to a processing operation to be classified into the second group is marked with a cross ("x") to distinguish it from a selection button corresponding to a processing operation to be classified into the first group. The method for making a selection button corresponding to a processing operation to be classified into the second group and a selection button corresponding to a processing operation to be classified into the first group distinguishable from each other on a menu screen is not limited to that described above. The selection buttons may be displayed in different display formats that allow a user to distinguish them from each other, such as in different colors or shades.

Instead of displaying selection buttons in different formats, a selection button corresponding to a processing operation to be classified into the second group may be hidden on a menu screen.

Ninth Exemplary Modification

In the foregoing exemplary embodiment, when a user operates a selection button corresponding to a processing operation to be classified into the second group on a menu screen, a confirmation screen is displayed. Instead of the configuration described above, for example, a message screen such as "Not Available" may be displayed to reject the execution of the processing operation corresponding to the current selection button.

Tenth Exemplary Modification

In the foregoing exemplary embodiment, a threshold value (threshold value of the number of selection buttons corresponding to processing operations to be classified into the first group on a user menu screen) used to determine which of the user menu screen and the default menu screen to display is "1", by way of example. The threshold value may be "0" or a natural number of 2 or more. For example, if the threshold value is "0", the default menu screen is displayed only when none of the selection buttons corresponding to the processing operations to be classified into the first group is displayed on a user menu screen.

Eleventh Exemplary Modification

In the foregoing exemplary embodiment, condition data indicates an attribute with limited use. The condition data indicates any form or type of condition as long as the condition data indicates a condition in which processing operations are classified into either the first group or the second group on the basis of attributes. For example, data indicating an attribute of a processing operation that is allowed to be used may be used as condition data.

Twelfth Exemplary Modification

In the foregoing exemplary embodiment, the content of condition data is set by a user. Alternatively or additionally, for example, multiple templates for condition data may be stored in the memory 1171 in advance, and a user may select one of the templates to set condition data for a processing apparatus 11.

Thirteenth Exemplary Modification

In the foregoing exemplary embodiment, no discussion has been made of the form how a program to be executed by the processor 101 in the processing instruction device 118 is provided. The program may be provided in the form of being recorded on a computer-readable recording medium such as a magnetic recording medium, an optical recording medium, a magneto-optical recording medium, or a semiconductor memory, or may be provided in the form being downloaded via a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing instruction device comprising:
   a memory that stores management data and condition data,
      the management data including one or more pieces of processing instruction data, processing identification data identifying the processing instruction data, and processing attribute data indicating an attribute of a processing operation indicated by the processing instruction data,
      each of the one or more pieces of processing instruction data being data for instructing at least one of an image forming device, an imaging device, and a data communication device to perform a processing operation,
      the condition data indicating a condition in which processing operations are classified into a first group and a second group based on attributes of the processing operations;
   a display instruction data acquisition unit that acquires display instruction data,
      the display instruction data including processing identification data identifying each of one or more pieces of processing instruction data selected from among the one or more pieces of processing instruction data,
      the display instruction data being data for giving an instruction to display an image including an operator corresponding to each of the one or more pieces of processing instruction data selected from among the one or more pieces of processing instruction data;
   a display controller that causes a display device to display an image in accordance with the display instruction data;
   an operation data acquisition unit that acquires operation data indicating an operation of a user from an operation device that receives a user operation; and
   a processing instruction unit that instructs at least one of the image forming device, the imaging device, and the data communication device to, in a case where the operation data acquisition unit acquires operation data indicating an operation on one of one or more operators included in an image while the image is being displayed on the display device, perform a processing operation in accordance with processing instruction data corresponding to the one operator, wherein
   the display controller causes the display device to display an image in accordance with the display instruction data in such a manner that, in accordance with the condition data based on an attribute indicated by the processing attribute data included in the management data, an operator corresponding to a processing operation classified into the first group is displayed on the display device in a different display format from an operator corresponding to a processing operation classified into the second group or an operator corresponding to a processing operation classified into the first group is displayed on the display device and an operator corresponding to a processing operation classified into the second group is not displayed on the display device.

2. The processing instruction device according to claim 1, wherein
   the memory stores, as default display instruction data, display instruction data different from the display instruction data acquired by the display instruction data acquisition unit,
      the display instruction data stored as default display instruction data including processing identification data identifying each of one or more pieces of processing instruction data selected from among the one or more pieces of processing instruction data stored in the memory,
      the display instruction data being data for giving an instruction to display an image including an operator corresponding to each of one or more pieces of processing instruction data selected from among the one or more pieces of processing instruction data stored in the memory, and
   the display controller causes the display device to display an image in accordance with the default display instruction data instead of the display instruction data acquired by the display instruction data acquisition unit in a case where the number of processing operations classified into the first group among processing operations identified by the processing identification data included in the display instruction data acquired by the display instruction data acquisition unit is less than or equal to a predetermined threshold value.

3. The processing instruction device according to claim 1, further comprising:
   a user identification data acquisition unit that acquires user identification data identifying a user, wherein
   the display instruction data acquisition unit acquires display instruction data relating to a user identified by user identification data acquired by the user identification data acquisition unit.

4. A processing apparatus comprising:
   the processing instruction device according to claim 1;
   at least one of an image forming device, an imaging device, and a data communication device that performs a processing operation in accordance with an instruction made by the processing instruction unit of the processing instruction device;
   a display device that displays an image under control of the display controller of the processing instruction device; and
   an operation device that delivers operation data indicating an operation of a user to the operation data acquisition unit of the processing instruction device.

5. A processing instruction device comprising:
   a memory that stores management data and condition data,
      the management data including one or more pieces of processing instruction data, processing identification data identifying the processing instruction data, and processing attribute data indicating an attribute of a processing operation indicated by the processing instruction data, each of the one or more pieces of processing instruction data being data for instructing at least one of an image forming device, an imaging device, and a data communication device to perform a processing operation, the condition data indicating a condition in which processing operations are classified into a first group and a second group based on attributes of the processing operations;

a display instruction data acquisition unit that acquires display instruction data, the display instruction data including processing identification data identifying each of one or more pieces of processing instruction data selected from among the one or more pieces of processing instruction data, the display instruction data being data for giving an instruction to display an image including an operator corresponding to each of the one or more pieces of processing instruction data selected from among the one or more pieces of processing instruction data;

a display controller that causes a display device to display an image in accordance with the display instruction data;

an operation data acquisition unit that acquires operation data indicating an operation of a user from an operation device that receives a user operation; and a processing instruction unit that instructs at least one of the image forming device, the imaging device, and the data communication device to, in a case where the operation data acquisition unit acquires operation data indicating an operation on one of one or more operators included in an image while the image is being displayed on the display device in accordance with the display instruction data, perform a processing operation in accordance with processing instruction data corresponding to the one operator, wherein in a case where the operation data acquisition unit acquires operation data indicating an operation on one of one or more operators included in an image while the image is being displayed on the display device, in accordance with the condition data based on an attribute indicated by the processing attribute data included in the management data, the display controller causes the display device to display an image which prompts a user to confirm that the user would like to execute a processing operation corresponding to the one operator in a case where the processing operation corresponding to the one operator is classified into the second group, and does not cause the display device to display an image which prompts a user to confirm that the user would like to execute a processing operation corresponding to the one operator in a case where the processing operation corresponding to the one operator is classified into the first group, and in a case where an image which prompts a user to confirm that the user would like to execute a processing operation classified into the second group is displayed on the display device, the processing instruction unit instructs at least one of the image forming device, the imaging device, and the data communication device to perform the processing operation if the operation data acquisition unit successfully acquires operation data for giving an instruction to execute the processing operation.

6. The processing instruction device according to claim 5, wherein the display controller causes the display device to display an image in accordance with the display instruction data in such a manner that, in accordance with the condition data based on an attribute indicated by the processing attribute data included in the management data, an operator corresponding to a processing operation classified into the first group is displayed on the display device in a different display format from an operator corresponding to a processing operation classified into the second group.

7. The processing instruction device according to claim 6, wherein the memory stores, as default display instruction data, display instruction data different from the display instruction data acquired by the display instruction data acquisition unit, the display instruction data stored as default display instruction data including processing identification data identifying each of one or more pieces of processing instruction data selected from among the one or more pieces of processing instruction data stored in the memory, the display instruction data being data for giving an instruction to display an image including an operator corresponding to each of one or more pieces of processing instruction data selected from among the one or more pieces of processing instruction data stored in the memory, and the display controller causes the display device to display an image in accordance with the default display instruction data instead of the display instruction data acquired by the display instruction data acquisition unit in a case where the number of processing operations classified into the first group among processing operations identified by the processing identification data included in the display instruction data acquired by the display instruction data acquisition unit is less than or equal to a predetermined threshold value.

8. The processing instruction device according to claim 6, further comprising:

a user identification data acquisition unit that acquires user identification data identifying a user, wherein the display instruction data acquisition unit acquires display instruction data relating to a user identified by user identification data acquired by the user identification data acquisition unit.

9. The processing instruction device according to claim 5, wherein the memory stores, as default display instruction data, display instruction data different from the display instruction data acquired by the display instruction data acquisition unit, the display instruction data stored as default display instruction data including processing identification data identifying each of one or more pieces of processing instruction data selected from among the one or more pieces of processing instruction data stored in the memory, the display instruction data being data for giving an instruction to display an image including an operator corresponding to each of one or more pieces of processing instruction data selected from among the one or more pieces of processing instruction data stored in the memory, and the display controller causes the display device to display an image in accordance with the default display instruction data instead of the display instruction data acquired by the display instruction data acquisition unit in a case where the number of processing operations classified into the first group among processing operations identified by the processing identification data included in the display instruction data acquired by the display instruction data acquisition unit is less than or equal to a predetermined threshold value.

10. The processing instruction device according to claim 5, further comprising:
a user identification data acquisition unit that acquires user identification data identifying a user, wherein
the display instruction data acquisition unit acquires display instruction data relating to a user identified by user identification data acquired by the user identification data acquisition unit.

11. A non-transitory computer readable medium storing a program causing a computer to execute a process, the process comprising:
storing management data and condition data,
the management data including one or more pieces of processing instruction data, processing identification data identifying the processing instruction data, and processing attribute data indicating an attribute of a processing operation indicated by the processing instruction data,
each of the one or more pieces of processing instruction data being data for instructing at least one of an image forming device, an imaging device, and a data communication device to perform a processing operation,
the condition data indicating a condition in which processing operations are classified into a first group and a second group based on attributes of the processing operations;
acquiring display instruction data,
the display instruction data including processing identification data identifying each of one or more pieces of processing instruction data selected from among the one or more pieces of processing instruction data,
the display instruction data being data for giving an instruction to display an image including an operator corresponding to each of the one or more pieces of processing instruction data selected from among the one or more pieces of processing instruction data;
causing a display device to display an image in accordance with the display instruction data;
acquiring operation data indicating an operation of a user from an operation device that receives a user operation; and
in a case where operation data indicating an operation on one of one or more operators included in an image is acquired from the operation device while the image is being displayed on the display device, instructing at least one of the image forming device, the imaging device, and the data communication device to perform a processing operation in accordance with processing instruction data corresponding to the one operator, wherein
the causing the display device to display an image in accordance with the display instruction data includes, in accordance with the condition data based on an attribute indicated by the processing attribute data included in the management data, causing an operator corresponding to a processing operation classified into the first group to be displayed on the display device in a different display format from an operator corresponding to a processing operation classified into the second group, or causing an operator corresponding to a processing operation classified into the first group to be displayed on the display device and causing an operator corresponding to a processing operation classified into the second group not to be displayed on the display device.

12. A non-transitory computer readable medium storing a program causing a computer to execute a process, the process comprising:
storing management data and condition data,
the management data including one or more pieces of processing instruction data, processing identification data identifying the processing instruction data, and processing attribute data indicating an attribute of a processing operation indicated by the processing instruction data,
each of the one or more pieces of processing instruction data being data for instructing at least one of an image forming device, an imaging device, and a data communication device to perform a processing operation,
the condition data indicating a condition in which processing operations are classified into a first group and a second group based on attributes of the processing operations;
acquiring display instruction data,
the display instruction data including processing identification data identifying each of one or more pieces of processing instruction data selected from among the one or more pieces of processing instruction data,
the display instruction data being data for giving an instruction to display an image including an operator corresponding to each of the one or more pieces of processing instruction data selected from among the one or more pieces of processing instruction data;
causing a display device to display an image in accordance with the display instruction data;
acquiring operation data indicating an operation of a user from an operation device that receives a user operation;
in a case where operation data indicating an operation on one of one or more operators included in an image is acquired from the operation device while the image is being displayed on the display device, in accordance with the condition data based on an attribute indicated by the processing attribute data included in the management data, causing the display device to display an image which prompts a user to confirm that the user would like to execute a processing operation corresponding to the one operator in a case where the processing operation corresponding to the one operator is classified into the second group, and causing the display device not to display an image which prompts a user to confirm that the user would like to execute a processing operation corresponding to the one operator in a case where the processing operation corresponding to the one operator is classified into the first group; and
in a case where operation data indicating an operation on one of one or more operators included in an image is acquired from the operation device while the image is being displayed on the display device or in a case where operation data for giving an instruction to execute the processing operation is acquired from the operation device while an image which prompts a user to confirm that the user would like to execute the processing operation is being displayed on the display device, instructing at least one of the image forming device, the imaging device, and the data communication device to perform a processing operation in accordance with processing instruction data corresponding to the one operator or in accordance with processing instruction data corresponding to the processing operation for which an instruction for execution has been given.

* * * * *